United States Patent [19]

Ushio et al.

[11] Patent Number: 4,688,320

[45] Date of Patent: Aug. 25, 1987

[54] METHOD FOR PRODUCING DISSIMILAR COATING FOR CONTINUOUS CASTING MOLD

[75] Inventors: Tetsuji Ushio, Fukuoka; Satoru Tatsuguchi, Chiba; Hoshiro Tani; Takashi Tsuzawa, both of Fukuoka, all of Japan

[73] Assignee: Mishima Kosan Corporation, Fukuoka, Japan

[21] Appl. No.: 908,922

[22] Filed: Sep. 8, 1986

Related U.S. Application Data

[60] Continuation of Ser. No. 521,471, Aug. 8, 1983, abandoned, which is a division of Ser. No. 313,123, Oct. 30, 1981, abandoned.

[51] Int. Cl.4 ............................................. B23P 17/00
[52] U.S. Cl. .................................. 29/527.4; 164/418
[58] Field of Search ........................... 29/527.4, 527.6; 164/19, 23, 33, 138, 418, 520, 527, 529

[56] References Cited

U.S. PATENT DOCUMENTS 4,037,646  7/1977  Hara et al. .......................... 164/418

FOREIGN PATENT DOCUMENTS 2310176  12/1976  France ............................... 164/418
45531    3/1980   Japan ................................. 164/418

Primary Examiner—Howard N. Goldberg
Assistant Examiner—Carl J. Arbes
Attorney, Agent, or Firm—Jordan and Hamburg

[57] ABSTRACT

A continuous casting mold includes a metallic substrate, an upper portion where the meniscus of molten metal is located during operation, a lower portion having a cross-sectional area smaller than the upper portion, the upper portion and lower portion being joined by a smooth curved surface, a coating of metal dissimilar to the substrate metal, highly resistant to wear, and extending over the curved surface, the curved surface having a radius of curvature at least fifteen to twenty-five times the thickness of the dissimilar metal coating, whereby the dissimilar metal will adhere strongly to the substrate to resist scratching and abrasion to thereby produce a smooth mold piece.

12 Claims, 12 Drawing Figures

FIG. 6
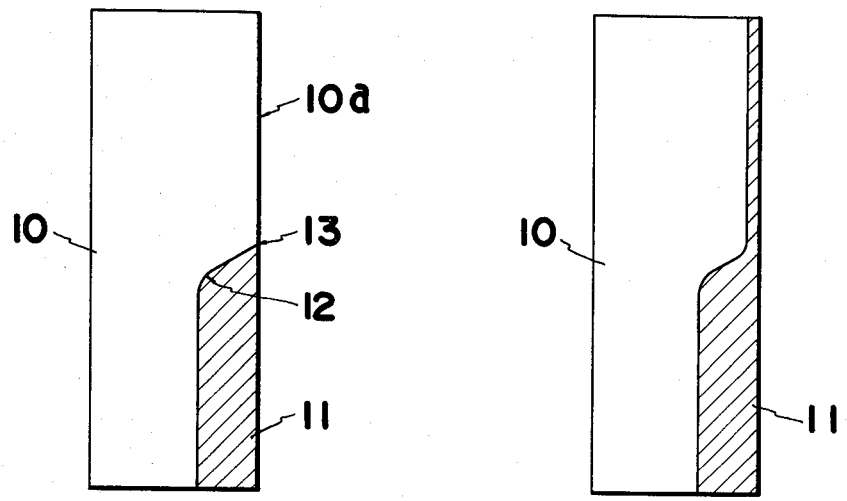
FIG. 8
FIG. 7
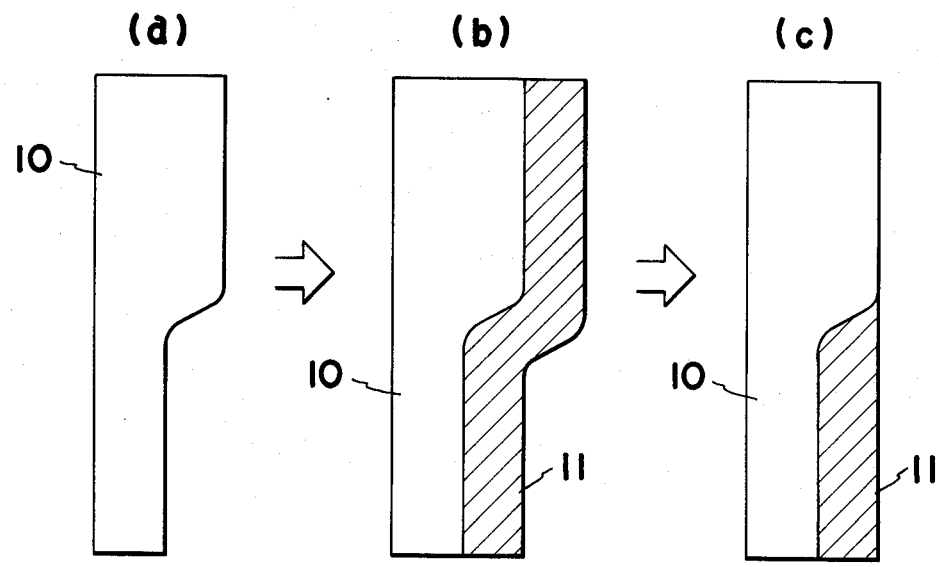

FIG. 9     FIG. 10     FIG. 11
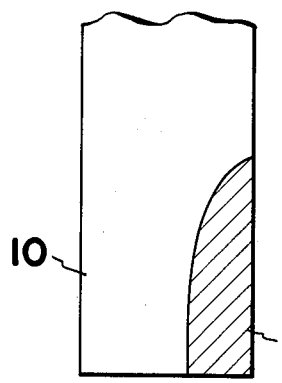
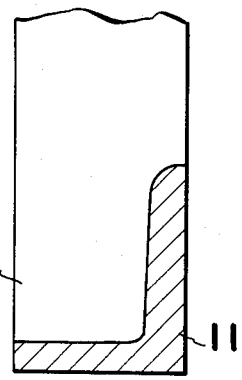
FIG. 12
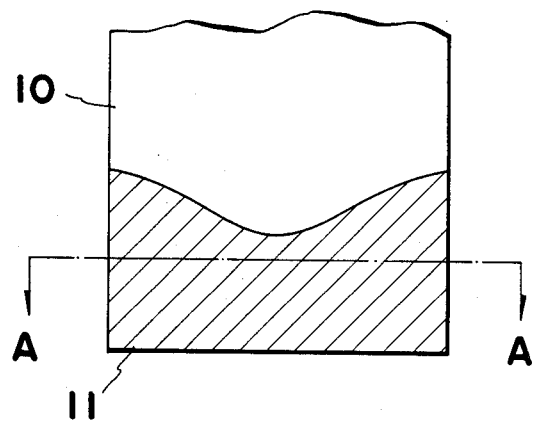
FIG. 13
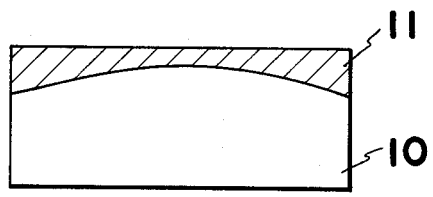

METHOD FOR PRODUCING DISSIMILAR COATING FOR CONTINUOUS CASTING MOLD

This application is a continuation of application Ser. No. 521,471, filed Aug. 8, 1983, now abandoned, which is a division of Ser. No. 313,123, filed Oct. 30, 1981, now abandoned.

BACKGROUND OF THE INVENTION

This invention relates to a continuous casting mold and method for producing the same. It features at least one coating of dissimilar metals of several layers at the lower part of a surface in the mold inner wall, a special feature is the provision of a coating of dissimilar metals of moderate thickness adhered to the lower part of the inner of the mold. The lower part of the mold is made of copper or copper alloys or both.

DESCRIPTION OF THE PRIOR ART

A continuous casting mold is made from metal having substantial thermal conductivity. Generally, copper and/or copper alloys are used to provide such conductivity. Molten steel flowing through a continuous casting mold is cooled gradually as it travels down inside the mold. As it cools a solidified shell forms at the exterior surface of the molten mass. In a lower part of the mold, the solidified shell often scratches scrapes off a portion of the inner wall of the mold with substantial force. Consequently the mold sustains considerable damages. Another undesirable effect is the diffusion and permeation of copper into the steel. The copper accumulates at the grain boundaries of the steel and causes embrittling cracks in the surface of the mold piece if Cu, Cu-alloys of the mold. Typically, to prevent the above-mentioned defects, the mold was coated with nickel or nickel base alloys, further materials containing chromium have been developed and deposited at a lower portion of the mold by means of electrodeposition, spraying or explodeposition. Recent methods of continuous casting have required special characteristics for the rate of pouring and special properties for the metal forming the surface of the mold piece. As greatly enhanced thermal conductivity becomes a requirement because of the amount of molten metal molded in a given time copper and/or copper alloys are used in the lower portion of the mold to facilitate the transfer of heat.

The first upper portion of the mold which first contacts the molten steel has a high level of corrosion resistance, heat resistance, favorable fatigue characteristics and considerable maximum working stress at elevated temperatures. The lower portion of such molds, that is, the part of the mold which first contacts the solidified surface of a mold piece has a high level of corrosion resistance and wear resistance.

As related known technology satisfies the above-mentioned needs, it is pointed that the surface of a lower part in the mold substrate is planed off to only a certain depth, and coated with a dissimilar metal which satifies the above-mentioned conditions at said planed part. But as shown in FIG. 2 and FIG. 3, the above-mentioned technology has some problems because both an upper part and a lower connected part are making angles in a connected part 12 of the mold substrate 10 and a dissimilar metal coating layer 11. That is to say, the following problems arise easily in the boundary on an upper connected part which is a meniscus part 10a, the relative motion of a molten steel shell drawing and oscillation of the mold, and spalling from the difference of thermal expansion with the mold substrate 10 and a dissimilar metal coating layer 11. And also in the boundary of a lower connected part, it is especially required that a thick coating layer be provided for the purpose of ensuring enough wear resistance. Available methods of coating include, explodeposition and electroforming. With those methods adhesion in the corner of an angle is bad, and this is especially true of the method of electroforming since it is difficult to coat thickly with that method as shows in FIG. 4.

SUMMARY OF THE INVENTION

It is an object of the present invention to provide corrosion resistance, heat resistance, favorable fatigue characteristics and a high maximum working stress at elevated temperatures in an upper part of the mold which contacts the molten steel and an excellent continuous casting mold having corrosion resistance and wear resistance in a lower part of the mold which contacts the solidified surface of a mold piece during operation. The above-mentioned continuous casting mold is otherwise summarized as follows. A continuous casting mold having dissimilar metal coating layers with enhanced wear resistance at a part lower than the meniscus part in a surface of the mold inner wall which is characterized that an upper part of boundary in the mold substrate and a dissimilar metal coating layer thereon is in the form of a curve, and the curved surface is formed so that $R=(15\sim 25)\times t$ where the thickness of a dissimilar metal coating layer is 't' and radius curvature is 'R'.

BRIEF DESCRIPTION OF THE DRAWINGS

FIG. 5 and FIG. 6 are detail views of practical examples of a continuous casting mold of the present invention;

FIG. 7 is a sequential diagram of a method for producing a continuous casting mold of our invention;

FIG. 8, FIG. 9, FIG. 10, FIG. 11 and FIG. 12 are detail views of a continuous casting mold of our invention, showing various modifications;

FIG. 13 is a cross-sectional view taken along the line A—A of FIG. 12.

DETAILED DESCRIPTION OF PREFERRED EMBODIMENTS

Figure 1:
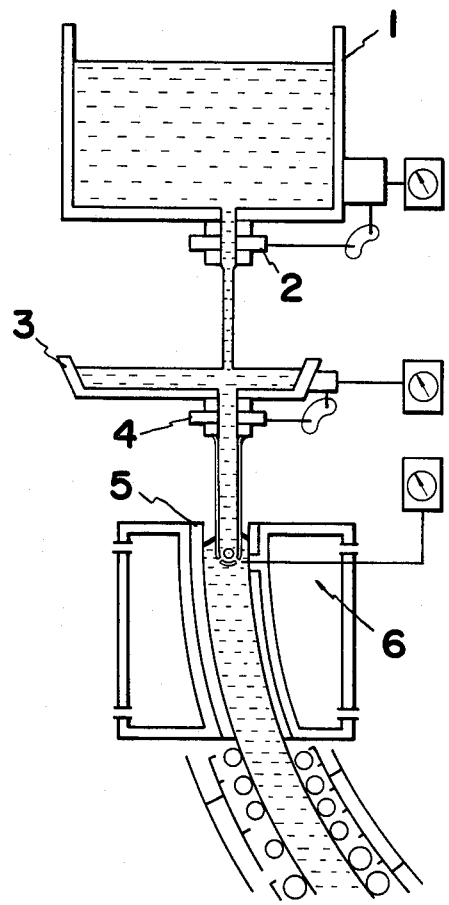
FIG. 1 is a schematic view of a system of continuously casting steel.

A continuous casting mold having dissimilar metal coating layers and a method for producing the same is further explained in the following description. The fundamental scheme of continuous casting equipment is shown in FIG. 1. In FIG. 1, 1 is a ladle to accumulate molten steel. The molten steel in the ladle is poured into a Tundish 3 through upper Sliding nozzle 2, through the lower Sliding nozzle 4 and then is poured into a continuous casting mold 5. In the continuous casting mold 5, the substrate is comprised of copper or copper base alloys of high thermal conductivity. The outer side of the substrate is reinforced by Backflame 6, which contains cooling water which flows through said backflame.

Figure 2:
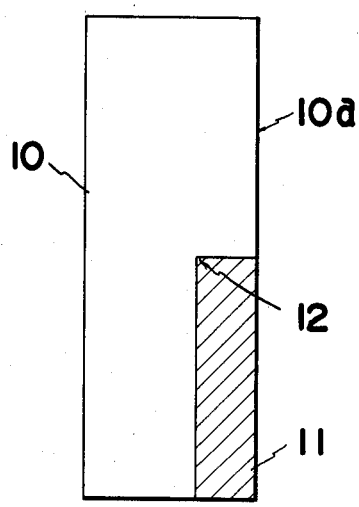
FIG. 2 and FIG. 3 are each detail views of conventional casting molds.
Figure 3:
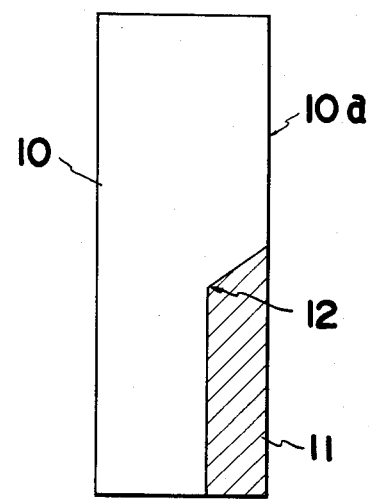
Figure 4:
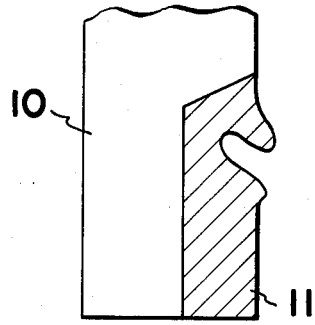
FIG. 4 is a detail view, showing the adhesive condition of dissimilar metal coating layers during operation of a continuous coating mold.

The molten steel is cooled as it comes down into the continuous casting mold 5, begins to solidify around its outer surface, and is supported by pinching rolls 7 after coming out of the mold. The cooling proceeds as the metal descends and it is thus formed into the mold 5 pieces. The mold used in this case is devised and carried out for an improvement of wear resistance in that the mold piece does not contact with Cu, or Cu-alloys directly as in the above-mentioned prior art because the mold has dissimilar metal coating layers which and of Ni. Consequently good wear resistance in a lower part inside of the mold substrate, which in FIG. 2 and FIG. 3 results. Namely, in FIG. 2, it is a coated wear-resistant dissimilar metal coating layer 11 which is below the meniscus part 10a of the mold substrate 10 which is made of Cu or Cu-alloys. An upper part of boundary 12 between a dissimilar metal coating layer 11 and the mold substrate 10 has an angular shape and therefore, it is very difficult to coat with a dissimilar metal coating layer 11. This is especially true in the case of electroplating which is widely used as a coating method, and in the case when electrodeposited dissimilar metal is placed in an angular position as shows in FIG. 4. If a long lasting electrodeposition coating of dissimilar metal, were attempted on this angular part, it is imperative that a coating thicker than required for the other part, be applied. Further sufficient time for grinding the desired finish.

Figure 5:
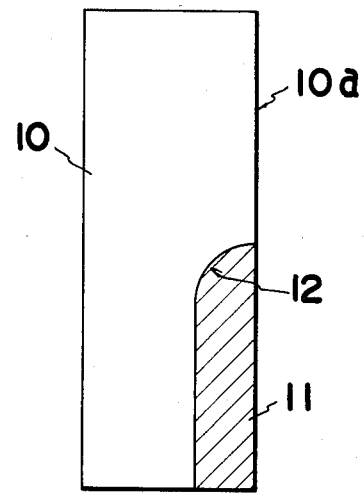

The mold in the present invention constructed as set forth above has, an upper boundary 12 between the mold substrate 10 and the dissimilar metal coating layer 11 forms a gently curved surface. An upper part of boundary 12 between the mold substrate and dissimilar metal coating layers which is shown in FIG. 5, and also an upper part of boundary 12 and top end 13 between the mold substrate and dissimilar metal coating layers which is shown in FIG. 6 are curved surface each of them. In the mold which is shown in FIG. 5 and FIG. 6, curved surface shape of an upper part of boundary 12 is provided by the thick layer of a dissimilar metal coating layer 11, and in the case of thick dissimilar metal coating layers, the radius of curvature becomes larger.

In the case of coatings of nickel 2 mm and 5 mm thick deposited by a method of electroforming, Table 1 shows the result of coating condition of the mold substrate surrounding upper part of boundary and Ni when curved surface shape of an upper part of boundary 12 was varied.

TABLE 1

| t | R | | | | | |
|---|---|---|---|---|---|---|
|   | none | 5 mm | 10 mm | 30 mm | 60 mm | 90 mm |
| 2 mm | no-good | no-good | no-good | good | good | good |
| 5 mm | no-good | no-good | no-good | no-good | no-good | good |

(Remarks)
t: thickness of Ni layer
R: radius of curvature of an upper part of boundary Additionally, in the above-mentioned Table 1, it is defined that over 10% in the difference of a thickness in an angle part and a thickness in a plan part is "no-good" whereas 10% or less in the difference is "good". As shown in Table 1, when the radius of curvature of an upper part of boundary 12 is much larger, the adherence is better, but thickness of dissimilar metal coating layers must be at least more than 1 mm because of considerable wear resistance. So dissimilar metal coating layers can be less thick when the radius of curvature is large. Because of the above reasons, it is desirable that the radius of curvature $R=(15\sim25)\times t$ where a dissimilar metal coating layer is of thickness 't'. Secondly to mention a method for producing a continuous casting mold, as shown in FIG. 7, the depth of a part lower than the meniscus part in the mold substrate 10 is 't', a curved surface of radius of curvature of $(15\sim25)\times t$ is ground in that upper part, and also a radius of curvature of about 't' is ground in a top end of a ground part. Subsequently a coating of dissimilar metal layers is placed over the whole surface of the mold inner wall (FIG. 7b). Finally, the surface of coated dissimilar metal is finished by grinding. Additionally, the relationship between the thickness of a dissimilar metal coating layer 11 in FIG. 7b and grinding finish allowances in the second process resulting in the structure of FIG. 7c, produces an upper part of boundary 13 of the mold substrate 10 and a dissimilar metal coating layer 11 with a curved surface and a straight surface as shows in FIG. 6 alternatively, the machinery operation can yield a dissimilar metal coating layers in the whole surface of the mold inner wall as shows in FIG. 8.

Also FIG. 9 to FIG. 13 show other practical examples of continuous casting molds of our invention. Namely, FIG. 9 shows a dissimilar metal coating layer 11 which becomes thicker toward the lower part of the mold. FIG. 10 has a layer 11 thickness at its lower portion. FIG. 11 shows an embodiment which provides improved adherence of the wear-resistant dissimilar metal layer to the base. Furthermore, FIG. 12 and FIG. 13 show the case of a wear-resistant dissimilar metal layer which is applied over a considerable length and thickly to the both side of a lower part of the mold which averts damages due to wear caused by a solidified shell on the mold piece.

According to our invention as the above-mentioned, coating of dissimilar metal layers is made easy as are uniform and strong coating layers. It is is possible to provide excellent wear resistance and long-life molds because the wear-resistant dissimilar metal layers are applied after forming a curved surface to an upper part of the boundary between an upper end of the mold substrate and the wear-resistant dissimilar metal layers. Cu, and/or Cu-alloys, which is the metals of the mold substrate and the mold pieces do not have to contact with the copper metal directly because of the dissimilar metal coating layer. The present invention averts between them, and it solves a defect in the product namely, embrittling cracks in the surface of the mold pieces produced.

What we claim is:

1. A method of producing dissimilar metal coating layers for a continuous casting mold in which the casting mold is formed as a metal substrate having an upper portion where the meniscus of molten metal is located during operation and wherein a lower portion of the substrate below the meniscus has a coating made of a dissimilar metal, comprising the steps of initially forming said mold with a substantially straight surface at said upper and lower portions, grinding said lower portion to a depth corresponding to the desired depth of the dissimilar metal while forming a transition surface between the ground lower portion and said upper portion, coating the dissimilar metal on said mold along said ground lower portion and said upper portion utilizing electrodeposition, grinding said dissimilar metal from said upper portion to provide a casting mold having an upper portion formed by the metal of said metal substrate and a lower portion formed of said dissimilar metal, said ground lower portion and said upper portion being formed as a straight surface, said grinding step consisting of grinding said transition surface with a radius of curvature within the range of from fifteen to twenty-five times the thickness of said dissimilar metal coating on said lower portion of the mold, whereby as a result of said redius of curvature within said range, the electrodeposited dissimilar metal will adhere strongly to the substrate to thereby increase the life of said continuous casting mold.

2. A method according to claim 1 further comprising coating said dissimilar metal uniformly on said ground lower portion and said upper portion.

3. A method according to claim 1 further comprising coating said dissimilar metal with the same thickness on said upper and lower portions.

4. A method according to claim 1, wherein said upper portion of said substrate has a thickness substantially the same as the combined thickness of said lower portion of said substrate and said dissimilar metal.

5. A method according to claim 1, wherein said metallic substrate comprises copper.

6. A method according to claim 1, wherein said metallic substrate comprises copper alloy.

7. A method according to claim 1, wherein said dissimilar metal comprises nickel.

8. A method according to claim 1, wherein said dissimilar metal comprises nickel alloy.

9. A method according to claim 1 further comprising grinding said lower portion to different depths with the lower section thereof having the greatest depth, said dissimilar metal in said lower portion having different depths with the lower section thereof having the greatest depth.

10. A method according to claim 1, wherein said lower portion of said substrate has a lower longitudinal end, said grinding step comprising grinding said portion of said substrate with a progressively increasing depth as said lower longitudinal end of said substrate is approached, said dissimilar metal in said lower portion of said substrate progressively increasing in depth as said lower longitudinal end of said substrate is approached.

11. A method according to claim 1, wherein said lower portion of said substrate has a lower longitudinal end, said coating step further comprising coating the dissimilar metal over said lower longitudinal end of said substrate such that the coated dissimilar metal extends transversely across said longitudinal lower end of said substrate.

12. A method of producing dissimilar metal coating layers for a continous casting mold in which the casting mold is formed as a metal substrate having an upper portion where the meniscus of molten metal is located during operation and wherein a lower portion of the substrate below the meniscus has a coating made of a dissimilar metal comprising the steps of initially forming said mold with a substantially straight surface at said upper and lower portions, grinding said lower portion to a depth less than the desired depth of the dissimilar metal while forming a transition surface between the ground lower portion and said upper portion, coating the dissimilar metal uniforming on said mold along said ground lower portion and said upper portion utilizing electrodeposition, grinding part of said dissimilar metal from said upper portion to provide a straight ground surface extending along said upper and lower portions with said lower portion having a thickness of dissimilar metal greater than the thickness of dissimilar metal on said upper portion, said grinding step consisting of grinding said transition surface with a radius of curvature within the range of from fifteen to twenty-five times the thickness of said dissimilar metal coating on said lower portion of the mold, whereby as a result of said radius of curvature within said range, the electrodeposited dissimilar metal will adhere strongly to the substrate to thereby increase the life of said continuous casting mold.

* * * * *